United States Patent
Alexander et al.

(10) Patent No.: US 11,196,768 B2
(45) Date of Patent: Dec. 7, 2021

(54) DETERMINATION OF PLAUSIBILITY OF INTELLIGENT TRANSPORT SYSTEM MESSAGES

(71) Applicant: Cohda Wireless Pty Ltd., Wayville (AU)

(72) Inventors: Paul Dean Alexander, Wayville (AU); John Lawrence Buetefuer, Wayville (AU); Malik Khan, Wayville (AU)

(73) Assignee: Cohda Wireless Pty Ltd, Wayville (AU)

( * ) Notice: Subject to any disclaimer, the term of this patent is extended or adjusted under 35 U.S.C. 154(b) by 239 days.

(21) Appl. No.: 16/102,972

(22) Filed: Aug. 14, 2018

(65) Prior Publication Data

US 2019/0068639 A1    Feb. 28, 2019

(30) Foreign Application Priority Data

Aug. 22, 2017   (AU) ................. 2017903375

(51) Int. Cl.
*H04L 29/06* (2006.01)
*H04W 4/40* (2018.01)
(Continued)

(52) U.S. Cl.
CPC .......... *H04L 63/1483* (2013.01); *H04L 63/14* (2013.01); *H04W 4/40* (2018.02);
(Continued)

(58) Field of Classification Search
CPC ...... H04L 63/1483; H04L 63/14; H04W 4/40; H04W 12/10; H04W 12/00503;
(Continued)

(56) References Cited

U.S. PATENT DOCUMENTS

| 6,683,527 | B1 * | 1/2004 | Greenwood | ............ B60R 25/04 |
| | | | | 307/10.2 |
| 10,075,294 | B2 * | 9/2018 | Huth | ............... H04L 9/0875 |

(Continued)

FOREIGN PATENT DOCUMENTS

| EP | 2743726 A1 | 6/2014 | |
| WO | WO-2005055009 A2 * | 6/2005 | ......... H04N 7/17318 |
| WO | WO-2010144970 A1 | 12/2010 | |

OTHER PUBLICATIONS

Leinmuller et al., "Position Verification Approaches for Vehicular Ad Hoc Networks", IEEE Wireless Communications, vol. 13, Issue: 5, Oct. 2006.*

(Continued)

*Primary Examiner* — Morshed Mehedi
(74) *Attorney, Agent, or Firm* — Schwegman Lundberg & Woessner, P.A.

(57) ABSTRACT

Disclosed herein is a method and system for determining plausibility of intelligent transport system (ITS) messages via a wireless communications channel at one or more message receivers. The method includes receiving a first ITS message having a first characteristic and receiving a second associated ITS message having a second characteristic. The method uses the first characteristic and the second characteristic to satisfy at least one predetermined criterion and determines plausibility of at least one of the first ITS message, the second ITS message and a third ITS message. The characteristic includes a PHY-layer or MAC-layer characteristic. The method is used to distinguish between genuine and spoofed messages to reduce the possibility of an attack.

15 Claims, 8 Drawing Sheets

(51) Int. Cl.
*H04W 12/10* (2021.01)
*H04W 12/12* (2021.01)
*H04W 12/63* (2021.01)
*H04W 12/79* (2021.01)
*H04W 4/46* (2018.01)
*H04W 12/06* (2021.01)

(52) U.S. Cl.
CPC ............. *H04W 4/46* (2018.02); *H04W 12/06* (2013.01); *H04W 12/10* (2013.01); *H04W 12/12* (2013.01); *H04W 12/63* (2021.01); *H04W 12/79* (2021.01)

(58) Field of Classification Search
CPC .......... H04W 12/00524; H04W 12/12; H04W 4/46; H04W 12/06
See application file for complete search history.

(56) References Cited

U.S. PATENT DOCUMENTS

| | | | | |
|---|---|---|---|---|
| 2004/0235499 A1* | 11/2004 | Tanaka | ................ | G01S 13/76 455/456.5 |
| 2008/0209521 A1* | 8/2008 | Malaney | ................ | H04L 63/10 726/4 |
| 2012/0209566 A1* | 8/2012 | Idiart | ................ | G01D 5/24461 702/179 |
| 2015/0067880 A1* | 3/2015 | Ward | ................ | H04W 12/02 726/26 |
| 2015/0200957 A1* | 7/2015 | Zhang | ................ | G08G 1/163 726/22 |
| 2017/0365171 A1* | 12/2017 | Haran | ................ | H04B 17/318 |
| 2018/0370540 A1* | 12/2018 | Yousuf | ................ | B60W 50/023 |
| 2019/0083360 A1* | 3/2019 | Biehl | ................ | A61J 3/002 |

OTHER PUBLICATIONS

"European Application No. 18188853.8, Extended European Search Report dated Nov. 16, 2018", (Nov. 16, 2018), 9 pgs.

Froschle, Sibylle B., et al., "Idea: Security Engineering Principles for Day Two Car2X Applications", ESSoS 2014 Proceedings of the 6th International Symposium on Engineering Secure Software and Systems—vol. 8364, pp. 213-221—Munich, Germany [abstract/excerpt], (Feb. 26, 2014), 2 pgs.

* cited by examiner

DETERMINATION OF PLAUSIBILITY OF INTELLIGENT TRANSPORT SYSTEM MESSAGES

CLAIM OF PRIORITY

This application claims the benefit of priority of Australia Patent Application No. 2017903375, filed on 22 Aug. 2017, the benefit of priority of which is claimed hereby, and which is incorporated by reference herein in its entirety.

FIELD OF THE DISCLOSURE

The present disclosure relates to a method, system and machine-readable-medium for determining plausibility of intelligent transport system (ITS) messages received via a wireless communications channel.

BACKGROUND OF THE DISCLOSURE

The Public-Key-Infrastructure (PKI) based security mechanisms have been used in vehicle-to-everything (V2X) based applications to provide security and verification required to trust a sender of an intelligent transport system (ITS) message. While these mechanisms provide a level of plausibility, they do not entirely eliminate the possibility of an attack by a malicious actor.

In current dedicated short-range communications systems (e.g., IEEE 802.11p or 3GPP Cellular-V2X), a message receiver can be set to trust a received message if it has a valid certificate. These certificates are stored in, for example, the on-board units (OBUs), and can be stolen to be used for causing misbehaviour. A malicious actor (attacker) can broadcast an Emergency Electronic Brake Lights (EEBL) message with a known GPS location, but without being present at that location. The broadcast will result in the surrounding cars having to take mitigating steps (e.g., warn driver or worse apply brakes). While this kind of attack can be addressed by the network by revoking the stolen certificates, the revocation process is not instant, for example the revocation can take from seconds to weeks or months, depending on implementation and policy framework.

Reference to any prior art in the specification is not, and should not be taken as, an acknowledgment or any form of suggestion that this prior art forms part of the common general knowledge in any jurisdiction or that this prior art could reasonably be expected to be understood, regarded as relevant and/or combined with other pieces of prior art by a person skilled in the art.

SUMMARY OF THE DISCLOSURE

According to a first aspect of the disclosure there is provided a method of determining plausibility of intelligent transport system (ITS) messages received via a wireless communications channel at one or more message receivers, the method including: receiving a first ITS message having a first characteristic; receiving a second ITS message having a second characteristic, the second message being associated with the first ITS message; determining, using the first characteristic and the second characteristic to satisfy a predetermined criterion, plausibility of at least one of the first ITS messages, the second ITS message and a third ITS message.

According to a second aspect of the disclosure there is provided a system of determining plausibility of intelligent transport system (ITS) messages received via a wireless communications channel, the system including: a first receiver configured to receive a first ITS message having a first characteristic; a second receiver configured to, or the first receiver further configured to, receive a second ITS message having a second characteristic, the second characteristic being associated with the first characteristic; and one or more processors for determining, using the first characteristic and the second characteristic to satisfy a predetermined criterion, plausibility of at least one of the first ITS messages, the second ITS message and a third ITS message.

According to a third aspect of the disclosure there is provided a non-transitory machine-readable medium including machine-executable instructions, which, upon execution by a machine, cause the steps of: receiving a first ITS message having a first characteristic; receiving a second ITS message having a second characteristic, the second characteristic being associated with the first characteristic; and determining, using the first characteristic and the second characteristic to satisfy a predetermined criterion, plausibility of at least one of the first ITS messages, the second ITS message and a third ITS message.

Further aspects of the present disclosure and further embodiments of the aspects described in the preceding paragraphs will become apparent from the following description, given by way of example and with reference to the accompanying drawings.

DETAILED DESCRIPTION

Introduction

Disclosed herein is a method, a system and a non-transitory machine-readable medium of determining plausibility of intelligent transport system (ITS) messages received via a wireless communications channel. In embodiments of the present disclosure, plausibility determination is achieved by the reconciliation of information from different sources to verify the integrity of one or more messages. The sources may differ in the receiving times of the messages (e.g., information derivable from consecutive packets received at the same receiver) and/or the receiving locations of the messages (e.g., broadcast information received at neighbouring road-side units (RSUs), or information received at multiple antenna elements of an antenna array).

Herein, "information" may refer to data contained within a data packet (e.g., location data, velocity data, transmitted power data, etc.). Alternatively or additionally, "information" may refer to observables or derivables determined from a physical signal carrying the data packet (e.g., channel estimates, received signal strength, angle of arrival, etc.).

In general, ITS messages include messages sent to alert, inform and/or warn users and/or vehicles of a transport system. Examples of ITS messages include any one or more of Emergency Electronic Brake Lights (EEBL) messages, Basic Safety Messages (BSMs), Cooperative Awareness Messages (CAMs), Decentralized Environmental Notification Messages (DENMs), Wireless Service Announcements (WSAs), Road Safety Messages (RSMs), Traveller Information Messages (TIMs), and Collective Perception Messages (CPMs). A skilled person would appreciate that description hereinafter on the plausibility determination of one type of ITS messages (e.g., EEBL messages) may, with minor modifications, also be applicable to other types of ITS messages.

In addition to addressing the malicious attacks described in the background, embodiments of the present disclosure can also be used to address a replay attack, which re-uses received messages and does not inject new information (e.g., a known GPS location) into the message. In addition to addressing the malicious attacks and the replay attacks described hereinbefore, embodiments of the present disclosure can also be used to identify fault detection. For example, a legitimate vehicle with a faulty GPS receiver is broadcasting incorrect location messages. In such a scenario, embodiments of the present disclosure may be used to identify faults, which could subsequently be reported to an ITS network. In turn, the ITS network may be configured to alert, advise or otherwise inform the faulty vehicle (or its driver or its owner) of the faults or adequate maintenance. Moreover, embodiments of the present disclosure may be used by a vehicle to check for any of its own faults (e.g., the vehicle could be configured to estimate its range to a known RSU and determine any error in the location accuracy of its positioning sensor, such as GPS sensor).

Figure 1:
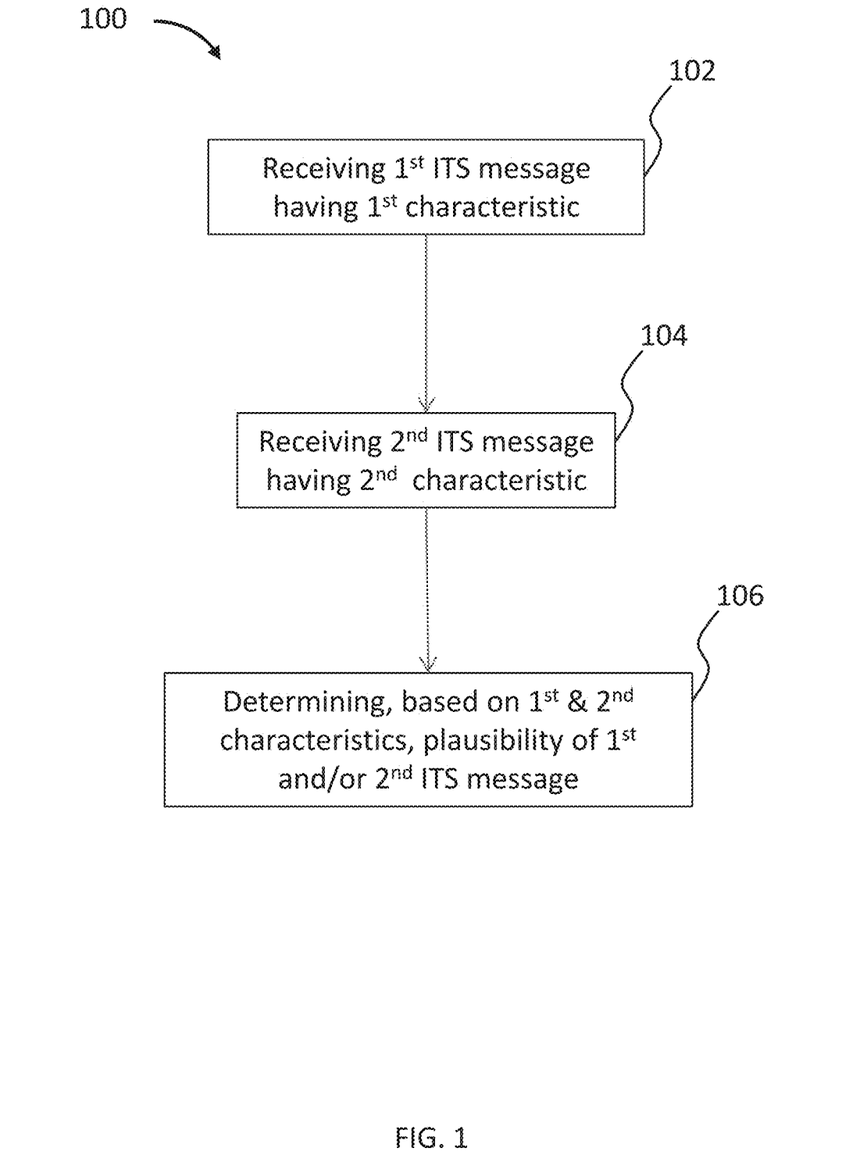
FIG. 1 illustrates an example method of the present disclosure.

FIG. 1 illustrates a flow chart of an example of the disclosed method 100 of determining plausibility of intelligent transport system (ITS) messages. The ITS messages are to be received via a wireless communications channel at one or more message receivers. In the present context, a message receiver may be a wireless receiver configured to receive packets of information transmitted at radio frequencies. In a general form, the disclosed method 100 includes the steps of receiving 102 a first ITS message having a first characteristic, receiving 104 a second ITS message having a second characteristic, and determining 106, based on at least the first characteristic and the second characteristic satisfying a predetermined criterion, plausibility of the first ITS message, the second ITS message and/or a third ITS message.

Further, the disclosed system includes: a first receiver configured to receive a first ITS message having a first characteristic, a second receiver configured to, or the first receiver further configured to, receive a second ITS message having a second characteristic, and one or more processors for determining, based on at least the first characteristic and the second characteristic satisfying a predetermined criterion, plausibility of the first ITS message and/or the second ITS message.

Further still, there is provided a non-transitory machine-readable medium including machine-executable instructions, which, upon execution by a machine, cause the steps of receiving a first ITS message having a first characteristic, receiving a second ITS message having a second characteristic, and determining, based on at least the first characteristic and the second characteristic satisfying a predetermined criterion, plausibility of the first ITS message and/or the second ITS message.

In general, the first and second messages arise from different sources but have certain correlation, relationship, linkage or otherwise association. This association facilitates the plausibility determination. For example, if the association satisfies a predetermined criterion, plausibility may be determined to be high or otherwise low. The association may relate to characteristics within a particular layer (e.g., PHY layer or MAC layer) of the communications model. The following description provides examples of suitable characteristics for facilitating the plausibility determination.

A skilled person would appreciate that plausibility may be determined based on characteristics of more than two messages. Relying on characteristics of more messages may improve the reliability of the plausibility determination, but may increase latency.

Hereinafter, plausibility may be a binary determination (e.g., plausible or not plausible), a probabilistic determination (e.g., high plausibility or low plausibility) or a comparative determination (more plausible or less plausible compared to a threshold level of plausibility). For simplicity, while examples hereinafter may use a binary, probabilistic or comparative determination, a skilled person would appreciate that the description on one form of plausibility determination is, with minor modifications, equally applicable to other forms of plausibility determination.

While the description hereinafter refers to roadway units (such as car, trucks, motorcycles, bicycles, and road-side units), a skilled person would appreciate that the description is also applicable with minor modifications to railway units (such as rail vehicles and rail-side units), devices carried by pedestrians or any transportation units.

PHY Layer Characteristics

The PHY layer refers to the physical layer of the Open Systems Interconnection (OSI) model, which in this case is the wireless or radio-frequency (RF) communications channel. In some arrangements, the first and second messages may be associated with information derivable from multiple successive packets received at the same receiver (e.g., packets transmitted from a transmitter at different times and received at the receiver at different times, or the same packet transmitted from a transmitter at the same time but received at the receiver by different receive antennas at different times). In these arrangements, the receiver may determine plausibility based on the association between information derivable from the first of the consecutive packets and information derivable from the second of the consecutive packets. The determination may be based on the association satisfying at least one predetermined criterion.

Frequency Offset

In one arrangement, the information derivable from consecutive packets for plausibility determination may be the estimated frequency offset. In a radio-frequency communications system, the transmitter (Tx) and receiver (Rx) are configured to tune in their local frequency oscillators to a common frequency for baseband data transmission using some modulation (e.g., OFDM). In practice, Tx and Rx frequency oscillators generate local frequencies that are not exactly identical (due to non-ideal attributes or conditions) but within standards-defined tolerance of offset limits (e.g., 20 PPM) of the operating frequency. The receiver is configured to estimate this offset and remove its impact for successful data demodulation. This estimate is known as local frequency offset. If the Tx and Rx move relative to each other, the relative velocity between the two induces a Doppler shift, which adds to the local frequency offset. Thus the estimated frequency offset is a combination of the local frequency offset and Doppler frequency shift. In vehicle-to-everything (V2X) systems, the local oscillators used are considered stable and generally have a small variation. Thus, in stationary scenarios, the frequency offset from packet to packet is generally very close (subject to slow drifts over time because of factors such as temperature, noise variations and/or vibrations). However, in dynamic scenarios, e.g., a car braking hard (decelerating) and issuing an Emergency Electronic Brake Lights (EEBL) message, the estimated frequency offset is expected to vary in proportion to the change in the Doppler shift.

Figure 2A:
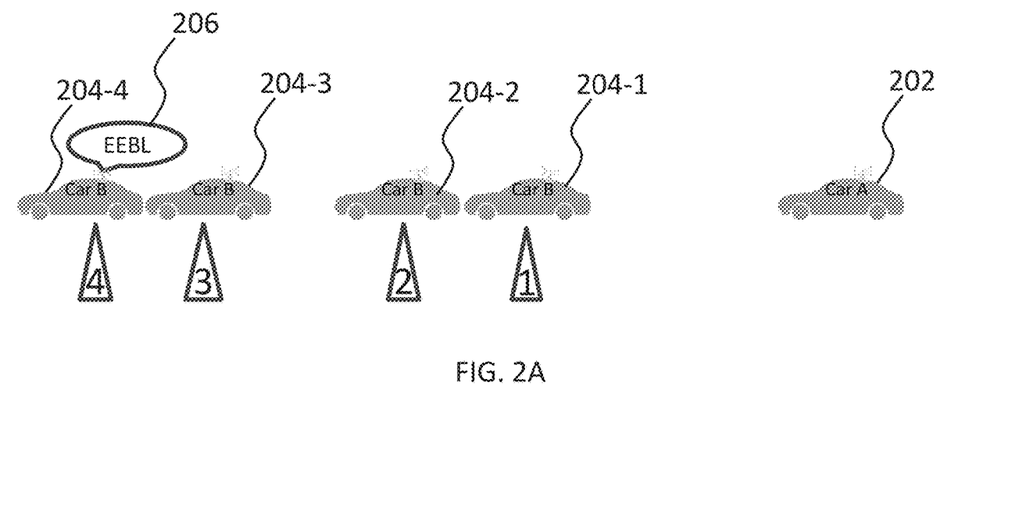
FIGS. 2A and 2B illustrate a decelerating vehicle and an example of the frequency offset of ITS messages as perceived by an approaching vehicle.

As illustrated in FIG. 2A, Car A 202 is configured to estimate the frequency offset of packets (e.g., Basic Safety Message (BMS) packets) from Car B 204 at various positions (1, 2, 3 and 4). At or near position 4, Car B 204 decelerates and issues an EEBL message 206. Where Car A 202 is travelling at or near a constant velocity relative to Car B in the lead up to position 4, the frequency offset of packets sent from Car B 204 and received at Car A 202 is expected to vary in accordance with a change in the Doppler shift. As exemplified in FIG. 2B, which is a mere illustration and does not necessarily depict actual readings, the frequency offset of these packets from the perspective of Car A is expected to vary as Car B decelerates.

Figure 2B:
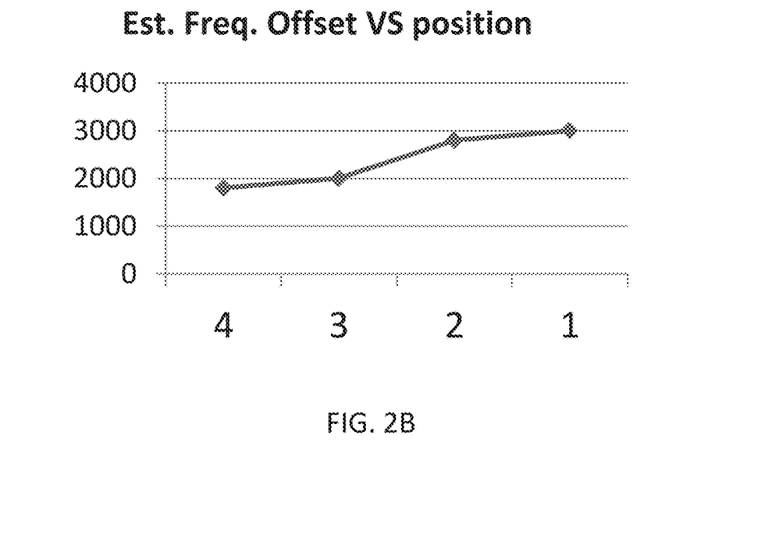

Accordingly, the estimated frequency offset of successive packets from a sender is expected to vary in the case of an abrupt change in velocity (e.g., hard braking). In particular, the plausibility determination of an EEBL message may be based on any corresponding change (e.g., beyond a threshold change or a background change) in frequency offset between the Tx and Rx radios over the successive packets satisfying a predetermined criterion. An example of this correspondence is depicted in FIG. 2B, where the change in frequency offset between positions 2 and 3 is greater than the background change in frequency offset between positions 1 and 2 and between positions 3 and 4. Based on the presence of a larger change in frequency offset before, at or after the receipt of an EEBL message, it may be determined that the EEBL message received at Car A is plausible or has high plausibility.

This corresponding change in frequency offset is difficult to emulate for an attacker. Furthermore, if an attacker is replaying an EEBL message first issued by a genuine sender, the frequency offset of the replayed EEBL messages will likely be different to that of the first EEBL message issued by the genuine sender. Based on an observation of the frequency offset of the first and subsequent EEBL messages, the plausibility of the subsequent EEBL messages may be determined. In particular, a markedly different frequency offset between a first and subsequent EEBL messages is an indication of the subsequent EEBL messages being sent by a replay attacker. Use of more than one message may also average out possible noise.

Received Signal Strength Indicator (RSSI)

In one arrangement, the information derivable from successive packets for plausibility determination may be the received signal strength indicator (RSSI). As the RSSI is a local measure which only a message receiver can see, it is difficult to replicate for every user in the vicinity by an attacker. The RSSI between a typical Tx and Rx is expected to vary slowly with time (e.g., with changes only occurring in the order of approximately half a second to a second for a car moving at 10 m/s). In other words, there is expected a strong time-correlation based on the relative velocity between the Tx and the Rx. The RSSI is expected to generally decrease (e.g., linearly) with the increasing distance between the Tx and Rx, and vice versa. Accordingly, in this arrangement, the plausibility may be determined based on the inverse relationship between RSSI and distance for successive packets.

Figure 3A:
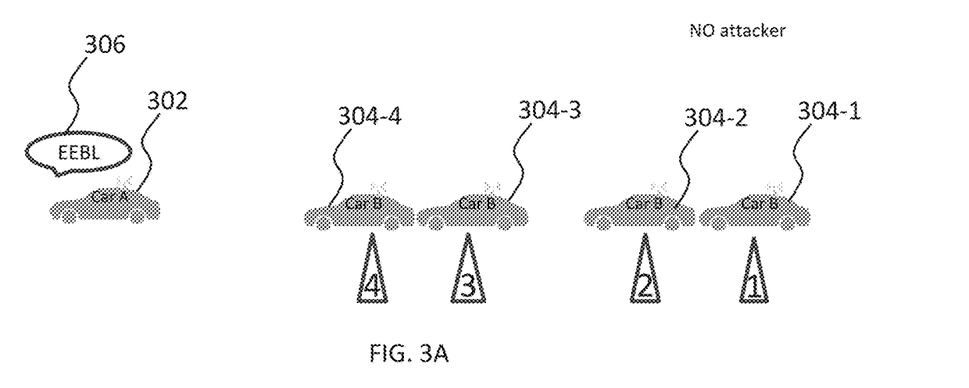
FIGS. 3A to 3D illustrate a decelerating vehicle and an example of the received signal strength indicator of ITS messages, with and without an attacker, as perceived by an approaching vehicle.
Figure 3B:
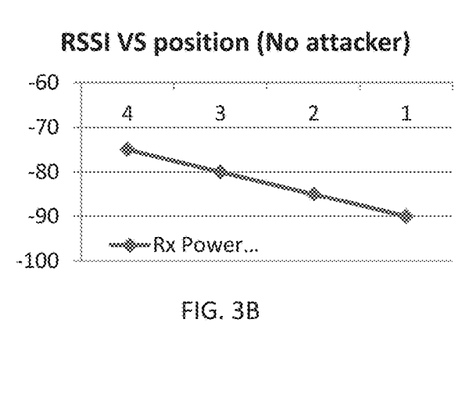
Figure 3C:
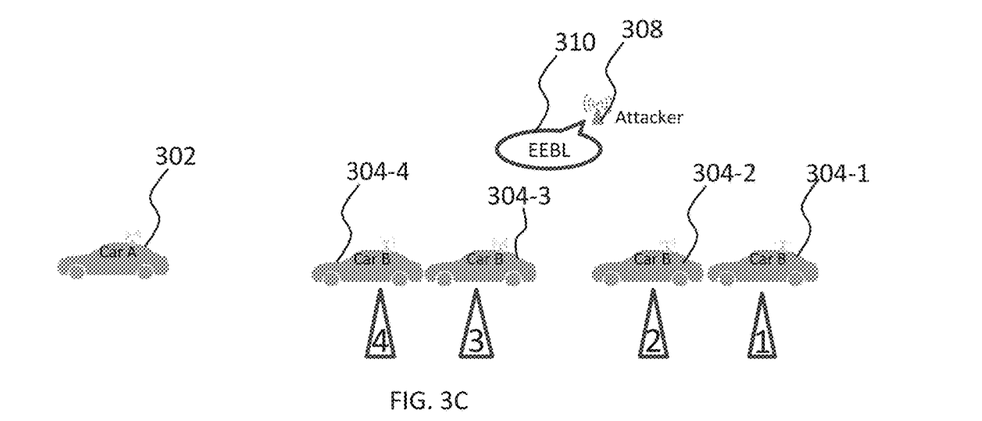
Figure 3D:
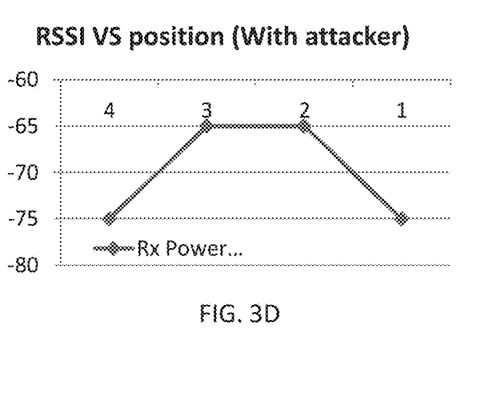

FIGS. 3A to 3D illustrate two scenarios, one with no attacker and the other with an attacker (replay or phantom). As illustrated FIG. 3A, where there is no attacker, Car A 302 is emitting an EEBL message 306. Car B 304 is approaching Car A 302 moving through various positions 1, 2, 3 and 4. As illustrated in FIG. 3B, the RSSI at Car B 304 increases when Car B 304 moves towards Car A 302 (and vice versa), indicating that an EEBL message 306 coming from the Car A 302 is plausible or has high plausibility. On the contrary, as illustrated in FIGS. 3C and 3D, where there is a replay attacker 308 broadcasting a replayed EEBL message 310 indicating a spoofed car position coinciding with that of Car A 302, the RSSI vs position (relative to Car A 302) does not generally decrease, such as linearly as per FIG. 3B. Here, the replay attacker 308 is closer to Car B 304 at positions 2 and 3 than it is at positions 1 and 4. The RSSI is therefore higher at positions 2 and 3 than it is at positions 1 and 4. This unexpected correlation between the RSSI vs position indicates that an EEBL message 308 coming from the Car A 302 is not plausible or has low plausibility. Accordingly, in this arrangement, plausibility of a message (e.g., an EEBL message) may be determined to be high if the RSSI vs position information (e.g., based on BSMs) is sufficiently correlated (e.g., having more than a threshold regression or R-squared coefficient), otherwise the plausibility is determined to be low. A skilled person would appreciate that Car A 304 does not have to be present (i.e. a phantom attack rather than a replay attack) for the attack to take place.

In one arrangement, the processor may be configured to estimate the RSSI or a range of RSSI. For example the RSSI or the range of RSSI may be determined based on any one or more of the transmitter power, the channel model, and the Tx and Rx direction of travel. If it is determined that the observed RSSI is inconsistent with the estimated RSSI or estimated range of RSSI (e.g., deviating beyond of threshold value from the estimated RSSI or estimated range of RSSI), the plausibility may be determined to be low.

Channel Correlation

In one arrangement, the information derivable from successive packets for plausibility determination may be the channel estimate (CE). A signal received from a particular transmitter (antenna port) to a particular receiver (antenna port) is generally unique and depends on the surroundings. The communications channels as observed from the original sender and the attacker (replayer) are therefore expected to be different. In practice, a RF signal propagation distance of around 5 times or more the signal wavelength between antennas makes the channels statistically independent. Thus a low correlation in CE between successive packets can be used to detect a replay attack (and the attacker).

Accordingly, in this arrangement, the plausibility may be determined based on correlation in the channel estimates over successive packets satisfying a predetermined criterion. For example, plausibility of an ITS message may be determined to be high if channel estimates over successive packets are sufficiently correlated (e.g., having more than a threshold regression or R-squared coefficient), otherwise plausibility is determined to be low. In one arrangement, this correlation between packets may be determined in the frequency or time domain.

Angle of Arrival Using an Antenna Array

In one arrangement, where a message receiver includes an antenna array, the information derivable from successive packets for plausibility determination may be an angle of arrival (AoA) of a received signal. An n-dimensional receive antenna array may be used to determine the angle of arrival of a received signal from a transmitter. Herein after, an angle of arrival also refers to a direction of arrival.

Figure 4:
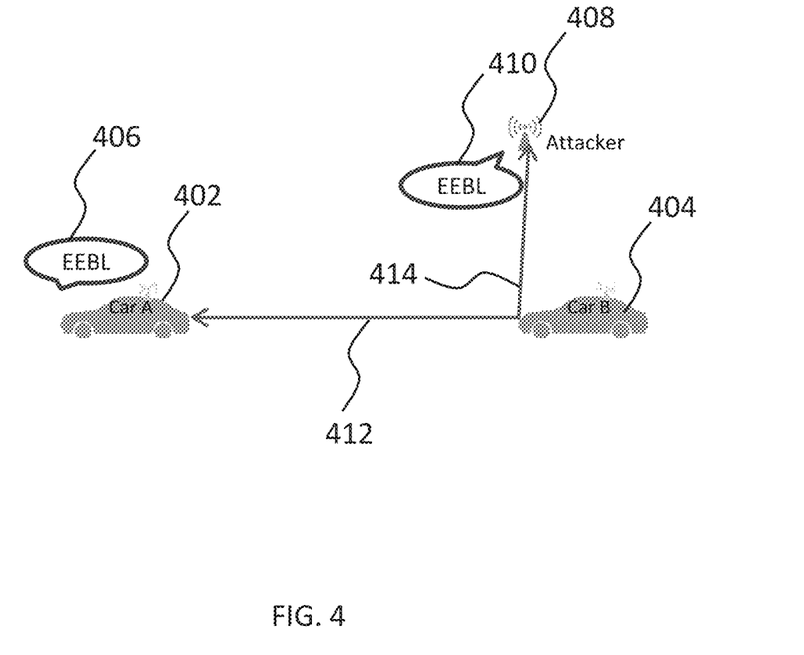
FIG. 4 illustrates a vehicle and an attacker having a different angle of arrival of ITS messages as perceived by an approaching vehicle.

The plausibility may be determined based on the AoA satisfying a predetermined criterion. For example, the plausibility may be determined based on the AoA in comparison to an angle derived from positions determined from BSMs. As illustrated in FIG. 4, as seen from Car B 404 having an antenna array, an EEBL message 406 generated by Car A 402 has an angle of arrival 412. However, as seen from Car B 404, a genuine EEBL message 406 generated by an attacker 408 generating a fake EEBL message 410 indicating a spoofed car position coinciding with that of Car A 30 has a different angle of arrival 414 compared to that of 412.

Accordingly, in this arrangement, the plausibility may be determined based on a comparison in AoA derived from successive packets (e.g., one AoA measured from an EEBL message, and another AoA computed from positions determined from BSMs) satisfying a predetermined criterion (e.g., beyond a threshold difference in AoA). For example, plausibility of an ITS message (e.g., an EEBL message) may be determined to be high if the difference in AoA over successive packets is less than a predetermined threshold, otherwise plausibility is determined to be low.

Line-of-Sight Status

In one arrangement, the information derivable from successive packets for plausibility determination may be the line-of-sight (LOS) status of the communications channel between the transmitter and the receiver. In general, a LOS channel and a non-LOS channel have different LOS metrics to distinguish between them. For example, these LOS metrics include antenna correlation between the two receive antennas, and an RMS delay of the time domain channel. Where a bad actor is hiding around a corner and replaying ITS messages, the LOS status is expected to vary between a LOS channel and a non-LOS channel (e.g., from initially a non-LOS channel, to a LOS channel, then finally a non-LOS channel). This variation between a LOS channel and a non-LOS channel may be used to detect a replay attacker.

Accordingly, in this arrangement, the plausibility may be determined based on LOS status derived from successive packets satisfying a predetermined criterion. For example, plausibility of an ITS message (e.g., an EEBL message) may be determined to be high if there is no change in the LOS status. Otherwise, if there is a change between a non-LOS channel and a LOS channel, the plausibility is determined to be low.

Techniques of determining LOS status or implementation of LOS detector may be found in, for example, PCT application no. PCT/AU2010/000762 titled "Characterisation of a wireless communications link", the entirety of which is incorporated herein by reference.

MAC Layer Characteristics

The MAC layer refers to the link layer of the Open Systems Interconnection (OSI) model. In some arrangements, the first and second messages may be the same broadcast information received at different message receivers (e.g., at different road-side units (RSUs) sharing information over a backhaul communications link). The first of the consecutive packets may contain information that correlates, relates, links or is otherwise associated with information contained in the second of the consecutive packets. In these arrangements, the receiver may determine plausibility based on the association between information derivable from the first of the consecutive packets and information derivable from the second of the consecutive packets satisfying a predetermined criterion.

Ranging Information

Some DSRC systems are based on the IEEE 802.11p protocol. As per the protocol, a received unicast packet is acknowledged by the packet receiver to the transmitter with an acknowledgement (ACK) packet, within a specified time frame, and after a set time gap (e.g., of 32 microseconds). By subtracting the set time gap, the return time $\Delta T$ of the packet can be determined, based on which the range D between the transmitter and receiver may be determined as $D=c\ \Delta T/2$, where c is the speed of light. Alternatively or additionally, the ranging information may be obtained based on the IEEE Fine Timing Management (FTM) protocol. In one example, the ranging information may be obtained over 3GPP-based Cellular-V2X or IEEE-based 802.11 networks.

In one arrangement, the information derivable for use in plausibility determination is ranging information. The ranging information may be obtained by active ranging. For example, where a nearby car (e.g., in front of has issued an EEBL message and plausibility determination is required, a ranging unicast packet is sent to the car issuing the EEBL message. By comparing ranging information measured via the ranging unicast packet with ranging information derived from other ITS messages (e.g., from a BSM packet), a malicious actor may be identified or a plausibility metric could be constructed.

Figure 5A:
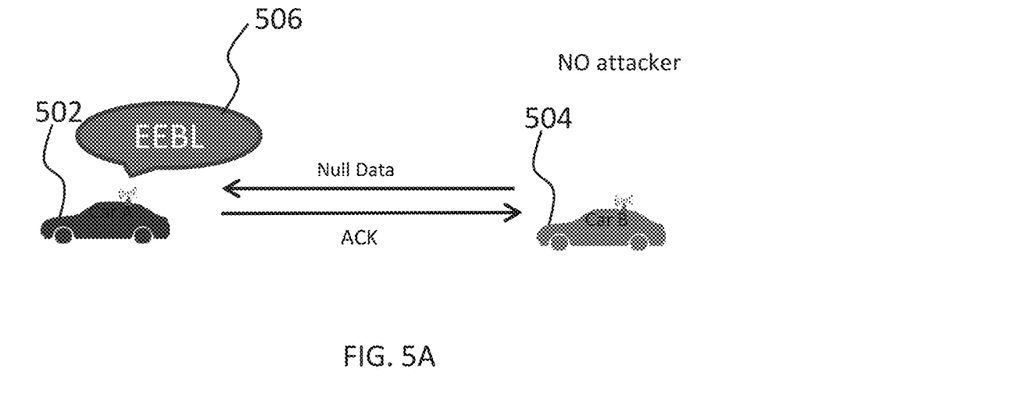
FIGS. 5A and 5B illustrate a vehicle and an attacker being actively ranged by an approaching vehicle.
Figure 5B:
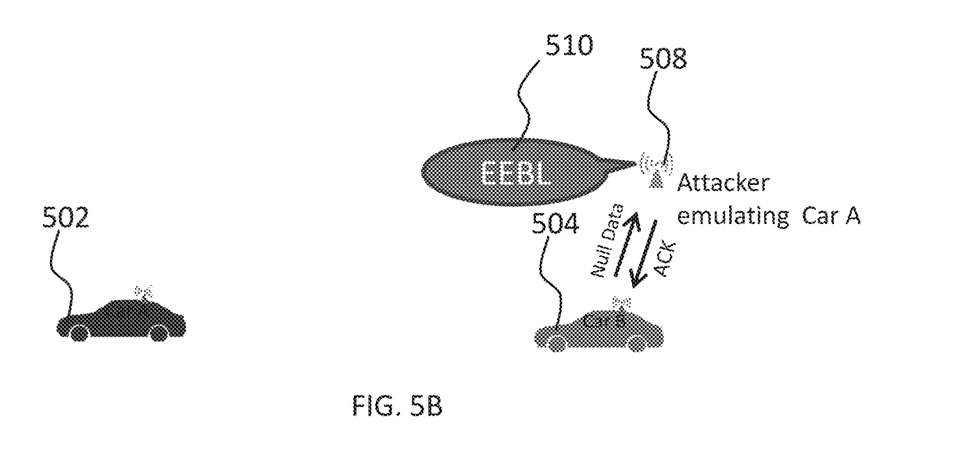

FIGS. 5A and 5B illustrate two scenarios, one with no attacker and the other with a malicious attacker (could be phantom or replay). As illustrated FIG. 5A, where there is no attacker, Car A 502 is emitting an EEBL message 506. Car B 504 is configured to determine the plausibility of the EEBL message 506 by transmitting a ranging unicast packet (e.g., a small or null data packet) to Car A 502, and determining the range D based on the return time $\Delta T$ of the ACK packet. The determined range D may make the EEBL message to be plausible or have high plausibility. On the contrary, as illustrated in FIG. 5B, where there is an attacker 508 emulating Car A 502 and sending an EEBL message 510, car B 504 is configured to determine the plausibility of the EEBL message 510 by transmitting a ranging unicast packet (e.g., a small or null data packet) to the attacker 508, and determining the range D based on the return time $\Delta T$ of the ACK packet. The determined range D is expected to be inconsistent with ranging information derived from other ITS messages (e.g., from a BSM packet). The determined range D may make the EEBL message to be implausible or have low plausibility. Accordingly, in this arrangement, plausibility of a message (e.g., an EEBL message) may be determined to be high if ranging information measured via ACK packets is consistent with ranging information derived from other ITS messages (e.g., based on BSMs), otherwise the plausibility is determined to be low (e.g., indicating an attacker or a fault in Car A 502).

Figure 6:
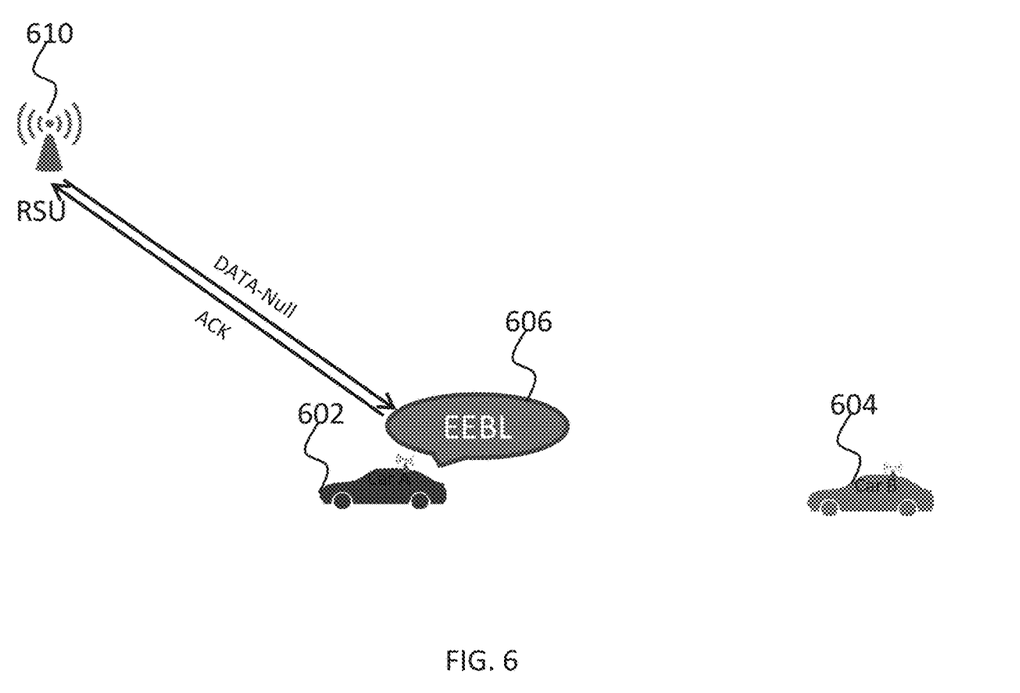
FIG. 6 illustrates a vehicle being passively ranged by an approaching vehicle.

In a related arrangement, the ranging information may be obtained by passive ranging. For example, as illustrated in FIG. 6, where a Car A 602 issues an EEBL message 606, a road-side unit (RSU) 610 may actively obtain ranging information from the RSU 610 to the Car A 602 by sending a ranging unicast packet to the car 602, while other cars in the vicinity, such as a Car B 604, may be configured to determine the return time $\Delta T$ by passively listening to the ranging unicast packet and the corresponding ACK to determine the range D. Plausibility of a message (e.g., the EEBL message 606) may be determined to be high if the ranging information measured via listening to the unicast packet and the ACK packet is consistent with ranging information derived from other ITS messages (e.g., based on BSMs), otherwise the plausibility is determined to be low (e.g., indicating an attacker or a fault in the car sending the EEBL message).

Further, passive and active ranging may be used in combination. For example, where a car issues an EEBL message, a first group of cars (e.g., nearby cars that are in an immediate danger of collision) may be configured to determine plausibility of the EEBL message by active ranging, while a second group of cars (e.g., further away cars that are not an immediate danger of collision) may be configured to determine plausibility of the EEBL message by passive ranging, by listening to the unicast ranging packet(s) and ACK packet(s) transmitted for active ranging by the first group of cars. In some arrangements, any one or more of the second group of cars may be configured to determine plausibility of the EEBL message by active ranging based on plausibility result by passing ranging. For example, responsive to result of passive ranging indicating that the plausibility is high, the plausibility may be determined (i.e. cross-checked) by active ranging.

Co-Operative Plausibility Determination

Figure 7:
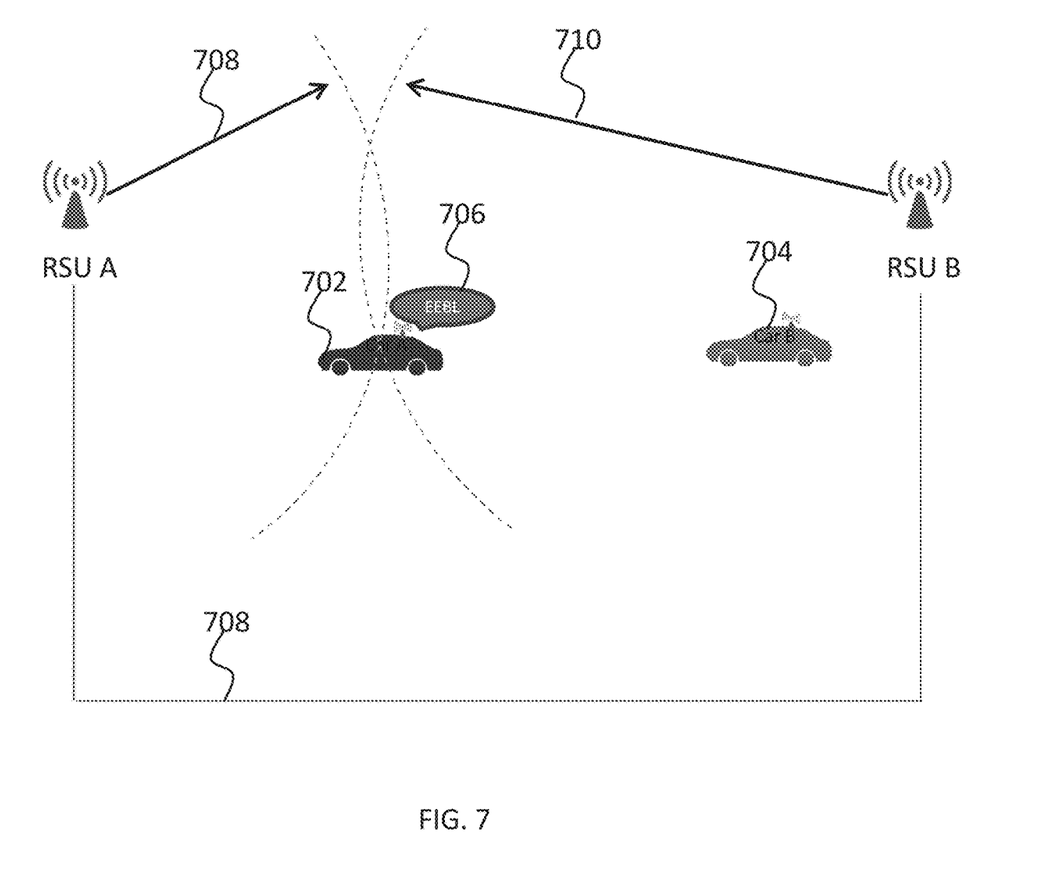
FIG. 7 illustrates a vehicle being actively ranged by two road-side units.

In one arrangement, the ranging information is derivable from differential timing of the same message received by separate infrastructure units. As illustrated in FIG. 7, a Basic Safety Massage (BSM) broadcast by Car A 702 is received by separate infrastructure units, such as road-side units (RSU A and RSU B). RSU A is configured to determine the range 708 of Car A 702 from RSU A. RSU A is configured to determine the range 710 of Car A 702 from RSU B. The infrastructure units RSUs A and B may be synchronized via the network time protocol (NTP) and/or the global positioning system (GPS). The infrastructure units share information derived from the BSM over a backhaul communications network 708. Based on the shared BSM information, the location of vehicle may be determined (e.g., by differential positioning approaches such as bilateration or trilateration). Plausibility may be determined based on whether the GPS location contained in the EEBL message 706 is within a bounded region determined based on the differential timing. The determination may be carried out by a processing unit connected to the network 708 or at one of the RSUs.

Where a non-plausible or low plausibility EEBL message is determined, the network 708 can report the vehicle for fault detection, certificate revocation or validation, or malicious behaviour. Alternatively or additionally, the RSUs can broadcast the list of vehicles whose plausibility determination does not pass (e.g., having low plausibility) to all vehicles, such as Car B 704, in the vicinity. In another arrangement, RSU A and/or RSU B may broadcast the differential timing to the vehicles to allow processors on the vehicles to determine plausibility of the message based on the differential timing.

In a similar arrangement, where the RSUs are replaced by a network of 'trusted' vehicles, the vehicles may be configured to determine the differential timing and sharing. This trust could be formed in a mutual manner between vehicles (by mutual ranging) and verification (BSM/GPS/ and RX PHY based values could be used for that). Once this trusted network is formed, then the relative timing information from BSMs received from surrounding cars could be shared over a service channel and plausibility about a vehicle position could be conducted. This is illustrated in FIG. 8.

Figure 8A:
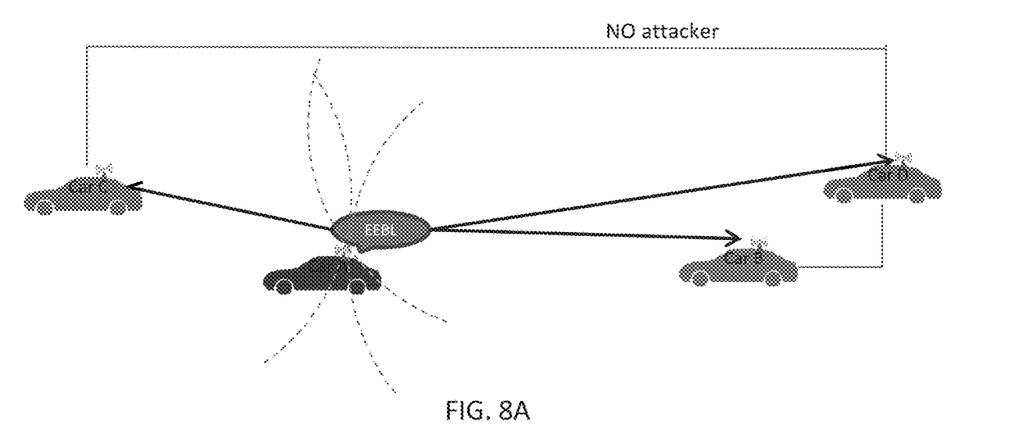
FIGS. 8A and 8B illustrate a vehicle being actively ranged by a group of vehicles sharing the ranging information.
Figure 8B:
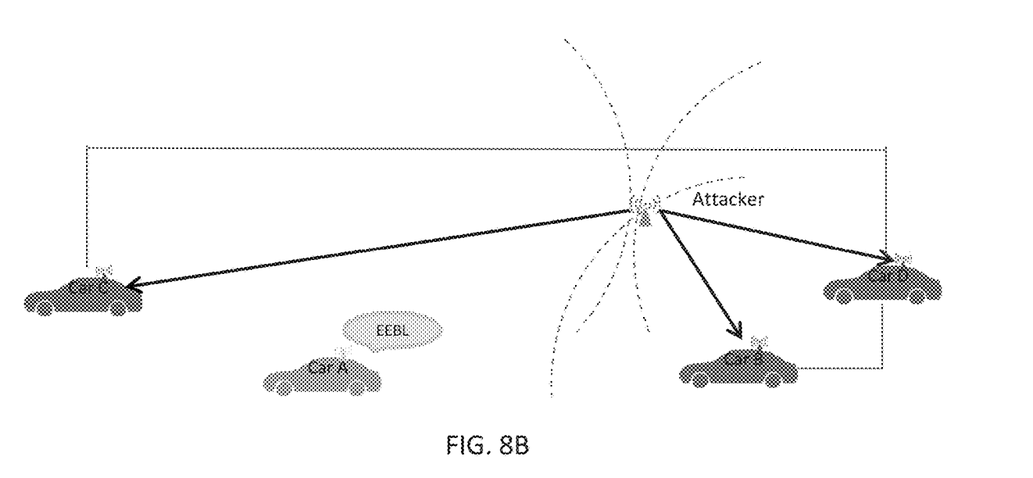

As illustrated in FIGS. 8A and 8B, where there is no attacker, Cars B, C and D formed a part of a 'trusted' network, based on ranging, certificate validation and other RF signatures. They communicate with other cars over a service channel and share information about the differential timing (in some common reference) of a warning message (e.g., EEBL) from a vehicle. Based on the shared differential timing information, the location of vehicle may be determined (e.g., by differential positioning approaches such as bilateration or trilateration). Where the determined location is inconsistent (e.g., different or deviates by a threshold distance) with that contained in the broadcast EEBL message, the plausibility of the warning message may be determined to be low, otherwise high.

A skilled person would appreciate that the disclosed plausibility determination may be used in addition to certificate based validation. Further, the disclosed plausibility determination does not necessarily be carried out on all received ITS messages. For example, the disclosed plausibility determination may be carried out on ITS messages received shortly before issuing a warning to a user.

A skilled person would appreciate that two or more of the above arrangements may be combined to form a combined plausibility determination. For example, the result of plausibility determination from each arrangement may contribute to an individual plausibility metric in order to form an even more reliable combined or overall plausibility metric.

Now that examples of the present disclosure are described, it should be apparent to the skilled person in the art that the described wireless receiver has the following advantages:

The present disclosure provides additional security and verification when trusting a sender of an ITS message.

The present disclosure may be used for maintenance prompts, fault detection or certificate validation.

It will be understood that the disclosure in this specification extends to all alternative combinations of two or more of the individual features mentioned or evident from the text or drawings. All of these different combinations constitute various alternative aspects of the disclosure.

We claim:

1. A method comprising:
receiving an intelligent transport system (ITS) message from a wireless transmitter via a wireless communication channel at one or more wireless receivers, the ITS message including positioning information of the wireless transmitter;
determining ranging information between the one or more wireless receivers and the wireless transmitter based on at least one of:
a return time of an acknowledgment (ACK) packet received from the wireless transmitter; or
differential timing of the ITS message received by two or more of the wireless receivers;
comparing the ranging information with the positioning information of the wireless transmitter; and
determining that the ITS message is at least one of a malicious, replay or faulty message upon determining that the ranging information is not within a threshold distance of the positioning information of the wireless transmitter.

2. The method of claim 1 wherein the ITS message includes an Emergency Electronic Brake Lights (EEBL) message, a Basic Safety Message (BSM), a Cooperative Awareness Message (CAM), a Decentralized Environmental Notification Message (DENM), a Wireless Service Announcement (WSA), a Road Safety Message (RSM), a Traveller Information Message (TIM), and a Collective Perception Message (CPM).

3. The method of claim 1 wherein the ITS message includes at least one of a genuine message and a spoofed message.

4. The method of claim 1 further comprising the step of detecting equipment fault upon determining that the ITS message is a faulty message.

5. A system including:
a wireless receiver configured to receive an intelligent transport system (ITS) message from a wireless transmitter via a wireless communications channel, the ITS message including information about the position of the wireless transmitter;
one or more processors for determining ranging information between the system and the wireless transmitter based on at least one of:
a return time of an acknowledgment (ACK) packet received from the wireless transmitter; or
differential timing of the ITS message received by the wireless receiver and another wireless receiver;
comparing the ranging information with the position of the wireless transmitter; and
determining that the ITS message is a malicious, replay or faulty message upon determining that the ranging information is not within a threshold distance of the position of the wireless transmitter.

6. A non-transitory machine-readable medium including machine-executable instructions, which, upon execution by a machine, cause the steps of:
receiving an ITS message from a wireless transmitter at the one or more wireless receivers, the ITS message including information about the position of the wireless transmitter;
determining ranging information between the one or more wireless receivers and the wireless transmitter based on at least one of:
a return time of an acknowledgment (ACK) packet received from the wireless transmitter; or
differential timing of the ITS message received by two or more of the wireless receivers;
comparing the ranging information with the position of the wireless transmitter; and
determining that the ITS message is a malicious, replay or faulty message upon determining that the ranging information is not within a threshold distance of the position of the wireless transmitter.

7. The system of claim 5 wherein the ITS message includes an Emergency Electronic Brake Lights (EEBL) message, a Basic Safety Message (BSM), a Cooperative Awareness Message (CAM), a Decentralized Environmental Notification Message (DENM), a Wireless Service Announcement (WSA), a Road Safety Message (RSM), a Traveller Information Message (TIM), and a Collective Perception Message (CPM).

8. The system of claim 5 wherein the ITS message includes at least one of a genuine message and a spoofed message.

9. The non-transitory machine-readable medium of claim 6 wherein the ITS message includes an Emergency Electronic Brake Lights (EEBL) message, a Basic Safety Message (BSM), a Cooperative Awareness Message (CAM), a Decentralized Environmental Notification Message (DENM), a Wireless Service Announcement (WSA), a Road Safety Message (RSM), a Traveller Information Message (TIM), and a Collective Perception Message (CPM).

10. The non-transitory machine-readable medium of claim 6 wherein the ITS message includes at least one of a genuine message and a spoofed message.

11. The method of claim 1, wherein determining the ranging information based on the return time of the acknowledgment (ACK) packet received from the wireless transmitter comprises:
transmitting, by the one or more wireless receivers, a ranging unicast packet to the wireless transmitter; and
receiving the acknowledgment (ACK) packet from the wireless transmitter in response to the ranging unicast packet.

12. The method of claim 1, wherein determining the ranging information based on the return time of the acknowledgment (ACK) packet received from the wireless transmitter comprises:
passively listening for a ranging unicast packet transmitted by one of the one or more wireless receivers to the wireless transmitter; and
passively listening for the acknowledgment (ACK) packet transmitted by the wireless transmitter in response to the unicast packet.

13. The method of claim 1, wherein determining the ranging information based on the differential timing of the ITS message received by the two or more wireless receivers comprises:
each of the two or more wireless receivers:
determining first ranging information from the corresponding wireless receiver to the wireless transmitter;
sharing the first ranging information with each of the other two or more wireless receivers; and
determining location of the wireless transmitter based on the shared first ranging information.

14. The method of claim 1, further comprising at least one of:
reporting a vehicle associated with the wireless transmitter for fault detection;
reporting the vehicle for revocation of certificate;
reporting the vehicle for malicious behavior; or
broadcasting information about the vehicle to other vehicles in the vicinity, upon determining that the ITS message is non-plausible or has low plausibility.

15. The method of claim 1, further comprising that the ITS message is a genuine message upon determining that the ranging information is within a threshold distance of the position of the wireless transmitter.

* * * * *